United States Patent [19]

Weedon et al.

[11] Patent Number: 5,032,338

[45] Date of Patent: Jul. 16, 1991

[54] METHOD TO PREPARE HIGH STRENGTH ULTRAHIGH MOLECULAR WEIGHT POLYOLEFIN ARTICLES BY DISSOLVING PARTICLES AND SHAPING THE SOLUTION

[75] Inventors: Gene C. Weedon; Thomas Y. Tam; Jim C. Sun, all of Richmond, Va.

[73] Assignee: Allied-Signal Inc., Morris Township, Morris County, N.J.

[21] Appl. No.: 355,234

[22] Filed: May 22, 1989

Related U.S. Application Data

[63] Continuation-in-part of Ser. No. 766,727, Aug. 18, 1985, abandoned.

[51] Int. Cl.$^5$ .............................................. D01F 6/04
[52] U.S. Cl. .................... 264/203; 264/205; 264/210.4; 264/210.7; 264/210.8; 264/211.15; 264/211.16; 264/211.18; 264/211.19; 264/237; 264/348
[58] Field of Search ................. 264/205, 210.8, 290.5, 264/211.14, 210.7, 203, 210.4, 211.15, 211.16, 211.18, 211.19, 237, 348; 526/352

[56] References Cited

U.S. PATENT DOCUMENTS

| | | | |
|---|---|---|---|
| 3,017,238 | 1/1962 | Levine et al. | 264/205 |
| 3,048,465 | 8/1962 | Jurgeleit | 264/205 |
| 3,210,452 | 10/1965 | Howard | 264/205 |
| 3,227,794 | 1/1966 | Anderson et al. | 264/205 |
| 3,882,095 | 5/1975 | Fowells et al. | 264/205 |
| 4,076,681 | 2/1978 | Boehme et al. | 366/76 |
| 4,248,819 | 2/1981 | Mayer et al. | 264/176 R |
| 4,413,110 | 11/1983 | Kavesh et al. | 264/205 |

FOREIGN PATENT DOCUMENTS

| | | | |
|---|---|---|---|
| 0131333 | 11/1946 | Australia | 264/205 |
| 0218673 | 9/1957 | Australia | 264/205 |
| 0621695 | 6/1961 | Canada | 264/203 |
| 0064167 | 11/1982 | European Pat. Off. | |
| 0115192 | 8/1984 | European Pat. Off. | |
| 0139141 | 5/1985 | European Pat. Off. | |
| 3004699 | 8/1980 | Fed. Rep. of Germany | |
| 0078238 | 5/1984 | Japan | |
| 0851979 | 10/1960 | United Kingdom | 264/203 |
| 2051667 | 1/1981 | United Kingdom | |

Primary Examiner—Hubert C. Lorin

[57] ABSTRACT

A method to prepare high strength high modulus polyolefin shaped articles comprising forming a heated solution of the polyolefin from particles of which about 75 to 100% by weight have a particle size of from about 100 to about 400 microns and having a weight average molecular weight of from about 300,000 to 7,000,000, then shaping the heated soltion then cooling the shaped solution. To further increase the strength of the article it can be stretched.

19 Claims, 3 Drawing Sheets

COMPARATIVE

METHOD TO PREPARE HIGH STRENGTH ULTRAHIGH MOLECULAR WEIGHT POLYOLEFIN ARTICLES BY DISSOLVING PARTICLES AND SHAPING THE SOLUTION

This application is a continuation-in-part of application Serial No. 766,727 filed Aug. 18, 1985 now abandoned.

BACKGROUND OF THE INVENTION

This invention relates to a method to prepare high strength ultrahigh molecular weight polyolefin articles by dissolving particles and shaping the solution. The article can be stretched to increase strength.

This invention is an improvement of the process disclosed in U.S. Pat. No. 4 413 110, hereby incorporated by reference, and useful in any other process using ultrahigh molecular weight polyolefin starting material. Disclosure of a similar apparatus and method to dissolve lower molecular weight polyolefin particles prior to flash spinning plexifilamentary material is found in U.S. Pat. No. 3 227 794 hereby incorporated by reference; see particularly examples V to VII. Other improvements to the process of U.S. Pat. No. 4 413 110 are found in pending U.S. Pat. No. application Ser. No. 745,164 filed June 17, 1985.

By reason of the ultrahigh molecular weight of the olefin polymers employed in these processes and other processes using this starting material, such polymer solutions have very high viscosities at low concentrations of the olefin polymer. The high viscosity of such polymer solutions makes it difficult to provide adequate stirring to assist in dissolving all of the olefin polymer. It is essential to uniformly dissolve all of the olefin polymer in the hydrocarbon solution, as it has been observed that the presence of even minute quantities of undissolved olefin polymer or nonuniformly concentrated portions in the polymer solution has an adverse effect upon the quality of the ultimate shaped articles, such as fibers, films or tapes prepared therefrom.

To facilitate the preparation of hydrocarbon solutions of such olefin polymers, it has been proposed to ameliorate the problem of dissolving the polymer by using very small particles to accelerate its rate of dissolution in the liquid hydrocarbon. Notwithstanding this technique, difficulties in dissolving all of the polymer particles, or ensuring uniform solution properties throughout, are still presented. It is believed that the difficulty results from the fact that the fine polymer particles imbibe hydrocarbon at their surface and swell to a volume substantially larger than the original size of the polymer particles. The surface of such swollen polymer particles tends to be quite tacky and, when such swollen polymer particles contact each other, they tend to fuse together and form agglomerates of the swollen polymer particles. Apparently the rate of diffusion of the liquid hydrocarbon into such agglomerates is slow. When "particles" are discussed herein what is meant is the basic dry (solvent-free) small particle of polymer, not the agglomerates, and not gels or swollen particles.

By "Gaussian curve" herein is meant a substantially bell-shaped curve and its related variations. That is, the bell-shape may be skewed, may have a sharp spike-like appearance or may be relatively flat bell shape, but substantially straight, multimodal or half bell-shape curves are not included.

SUMMARY OF THE INVENTION

This invention provides a method which not only dissolves ultrahigh molecular weight olefin polymer in liquid hydrocarbon at relatively high rates, but also completely dissolves all of the olefin polymer so that the solution obtained therefrom is substantially uniform in properties throughout and free of undissolved polymer particles.

This invention is a method to prepare high strength, high modulus polyolefin shaped articles comprising forming a heated solution of the polyolefin from particles of which about 75 to about 100 percent by weight have a particle size of from about 100 to about 400 microns and having a weight average molecular weight of from about 300 000 to 7 000 000, the particle size being distributed in a substantially Gaussian curve of particle sizes centered at about 125 to 200 microns so that the the polyolefin particles are completely dissolved and the solution obtained therefrom is substantially uniform in properties throughout then shaping the heated solution, then cooling the shaped solution, then stretching the extruded solution. The cooling can be either after removal of the solvent from the shaped solution or during or before removal of the solvent from the solution. Preferably, about 85 to 100% of the particles have a particle size between about 120 and 350 microns. Also preferably the molecular weight is between about 700 000 and 5 000 000. The preferable polyolefin is polyethylene, preferably with a molecular weight from about 700 000 to about 5 000 000. The preferred article is a fiber, but it could be a fiber, film, tape or other such extrudable article. The preferred intrinsic viscosity level for the polyethylene is between 7 to 30 and more preferably between about 23 and 30 or alternatively between about 15 and 19. It is also preferred that at least about 40% of the particles be retained on a No. 80 mesh screen. The preferred solvent is a hydrocarbon having a boiling point over 100° C. It is preferred that the solvent be selected from the group consisting of halogenated hydrocarbon, mineral oil, decalin, tetralin, naphthalene, xylene, tolune, dodecane, undecane, decane, nonane, octene, and low molecular weight polyethylene wax. Preferably the solution consists of about 1% to 35% more preferably 2 to 20%, polyolefin by weight. The stretching of the extruded solution can be before or after removal of a solvent or both. The shaped article is preferred to have been stretched to a length at least five times its original length.

Various known additives to improve solution, polymer or fiber properties can be added; for example, antioxidants, viscosity modifiers, ultraviolet light stabilizers, fillers, delusterants and the like can be added to the polymer particles or solution. However, it has been found that the solution is unfavorably affected by stearates, such as sodium or calcium stearate, a processing aid added for mold release for other end-uses of polyolefins.

DETAILED DESCRIPTION OF THE DRAWINGS

Figure 1:
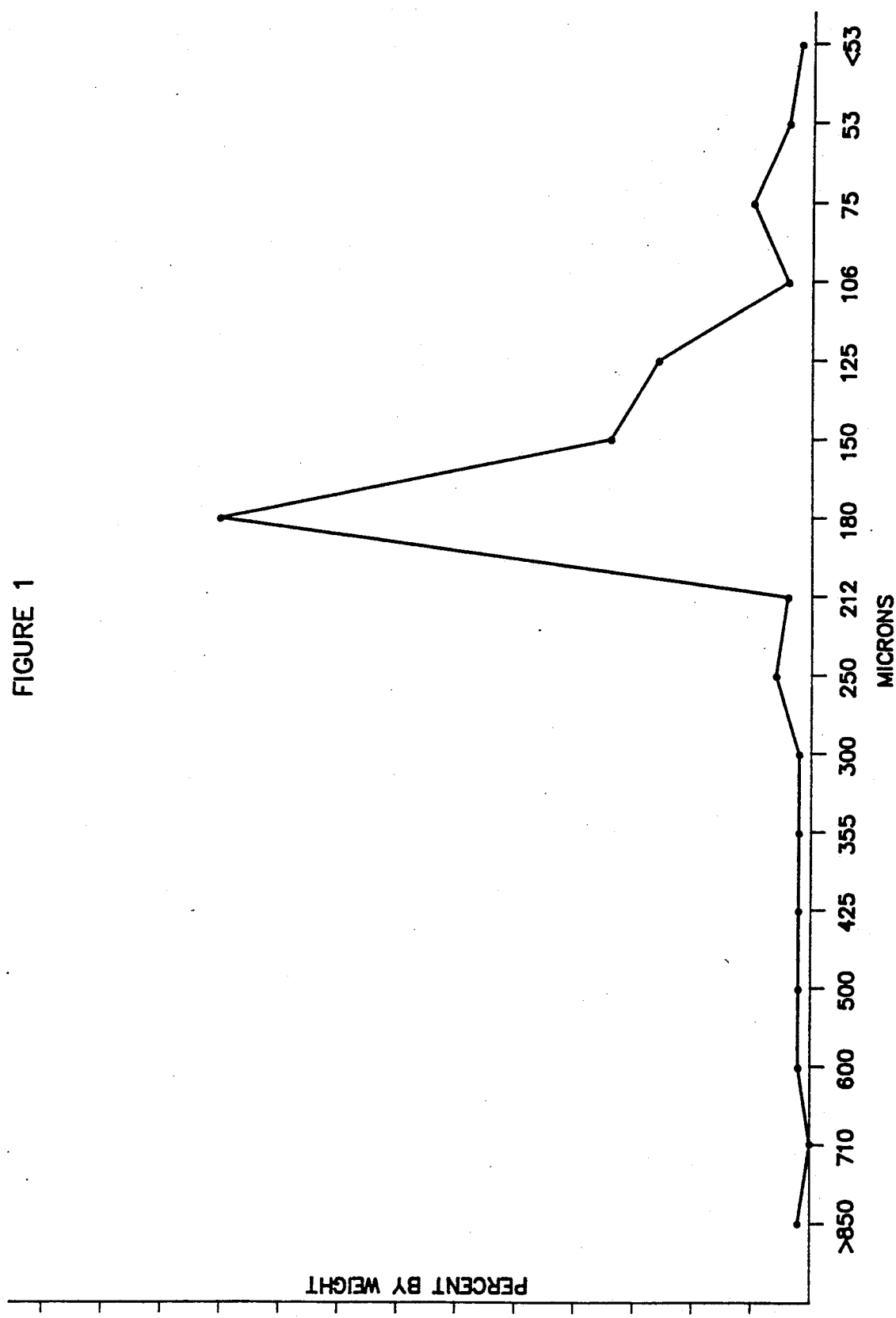
FIG. 1 is a substantially Gaussian curve of percent by weight polyethylene particles plotted against particles size in microns for a commercially successful embodient of this invention.
Figure 2:
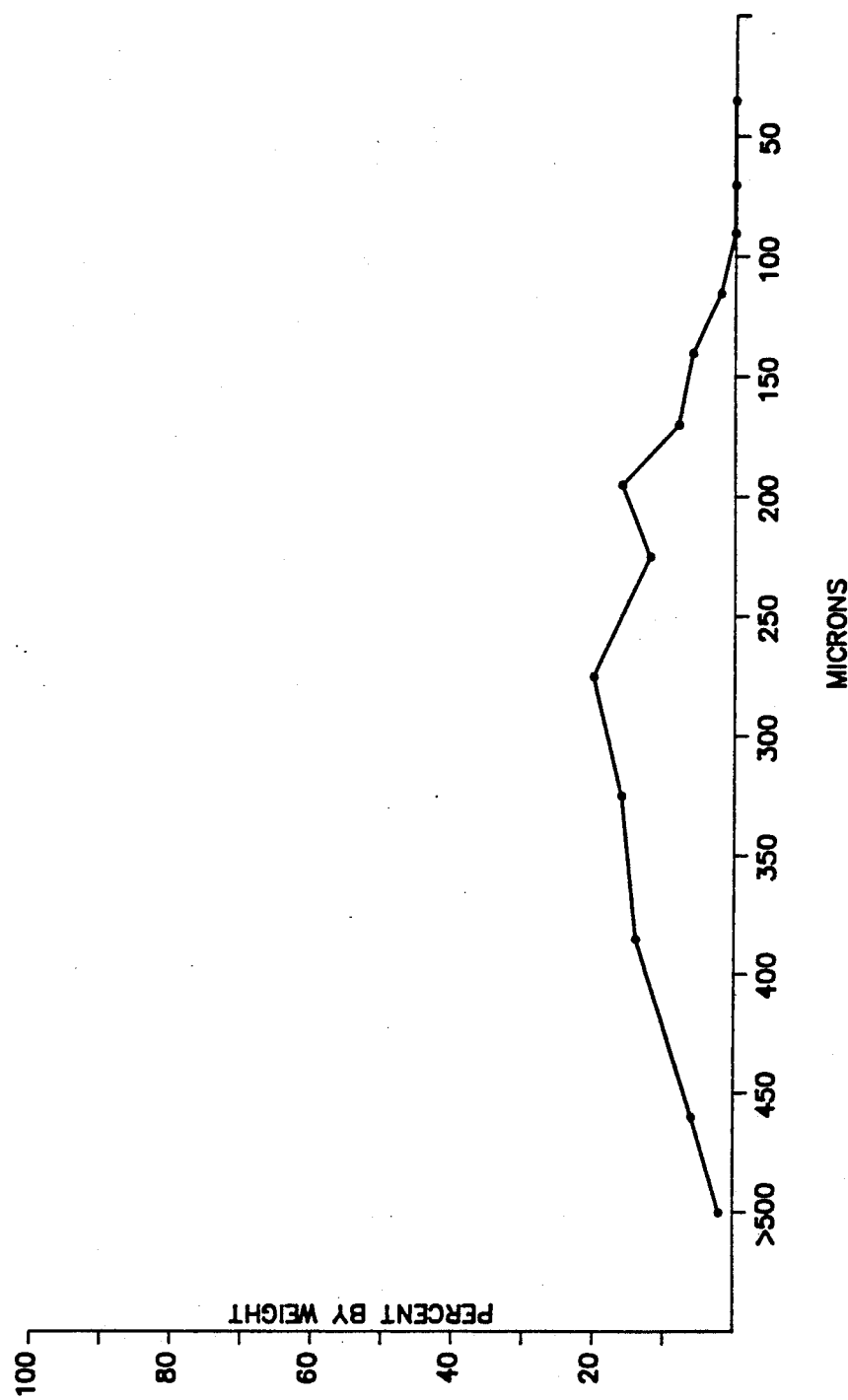
FIG. 2 is a comparative example of a non-Gaussian nearly flat, bimodal distribution curve of percent by weight polyethylene particles versus particle size in microns.
Figure 3:
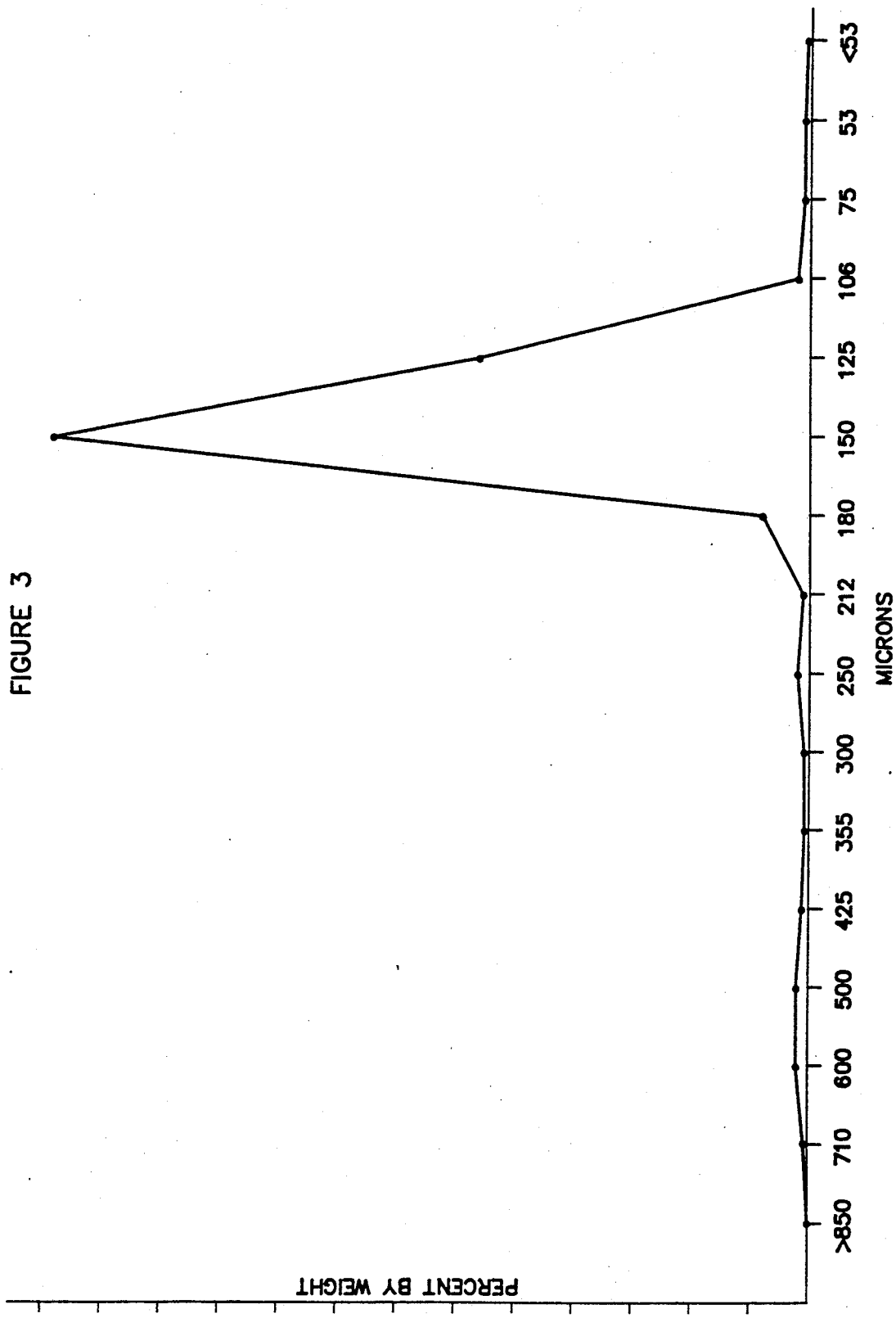
FIG. 3 similar to FIG. 1 is a curve of another embodiment of this invention plotted with the same parameters as above.

FIG. 1 shows an actual substantially Gaussian distribution curve for percent by weight of polyethylene particles by particle size in microns of a commercially successful polyethylene polymer having an intrinsic viscosity of 8.2 which was processed in a commercial production process similar to that described in Example 1 of the above-identified patent application. Very few filament wraps and almost no yarn end (bundle) breaks occurred during processing of polymer with this particle size distribution. Note the pronounced peak of particles at 150 microns. The same was true for a similar production run using polymer having an intrinsic viscosity of 7 and having the particle size distribution shown in FIG. 3. Here the peak was at 180 microns. However, we have discovered that the actual non-Gaussian broad distribution of particle size shown in FIG. 2 would dissolve in such a non-uniform manner that multiple wraps on processing rolls and complete breaks of yarn ends would occur, much as result of Lots 4 and 11 shown in Table I which had too high weight percent of fine particles.

DESCRIPTION OF THE PREFERRED EMBODIMENTS OF THE INVENTION

EXAMPLE 1

Ultrahigh molecular weight (weight average) polyethylene polymers having the intrinsic viscosity (I.V.) and particle size distribution set forth in Table I were processed into high strength fiber.

TABLE I

| PARTICLE SIZE DISTRIBUTION OF POLYMER LOTS | | | | | | | | |
|---|---|---|---|---|---|---|---|---|
| Lot No. | I.V. | I.V. (Retest) | #40 | #60 | #80 | #100 | #200 | Pan |
| 1 | 26 | 26 | 0.2 | 12.5 | 46.3 | 22.9 | 18.1 | 0 |
| 2 | 27 | 29 | 0 | 15.6 | 67.7 | 12.5 | 4.0 | 0.2 |
| 3 | 26 | 24 | 0 | 6.3 | 35.7 | 35.3 | 22.4 | 0.2 |
| 4 | 23 | 24 | 0 | 6.5 | 20.0 | 16.2 | 55.9 | 1.4 |
| 5 | 21 | 23 | 0.2 | 0.4 | 56.7 | 32.8 | 8.4 | 1.4 |
| 6 | 25 | 23 | 0 | 1.0 | 56.5 | 39.1 | 3.4 | 0.6 |
| 7 | 28 | 24 | 0 | 0.6 | 46.5 | 49.3 | 3.2 | 0.4 |
| 8 | 30 | 32 | 0 | 0.2 | 58.2 | 36.4 | 4.4 | 0.8 |
| 9 | 25 | 26 | 0 | 18.0 | 52.1 | 19.5 | 10.0 | 0.4 |
| 10 | 17 | — | 0 | 3.0 | 38.0 | 35.6 | 23.1 | 0.4 |
| 11 | 18 | 18 | 0.6 | 2.0 | 5.0 | 7.2 | 79.6 | 5.7 |

A number 40 screen sieve has openings of about 420 microns; similarly a number 60, about 250 microns; number 80, 177 microns; number 100, 149 microns; and number 200 has openings of about 74 microns. Those particles which drop through to the pan would have a particle size of less than 74 microns. The sieve screening test is carried out in the conventional manner using the method given in W. S. Testing Sieve Handbook No. 53 (1982) on pages 14–15 by Tyler Company of Mentor, Ohio, by vibrating the series of screens with each next larger opening screen just above the next smaller opening screen. A small amount of conductive carbon black or small ($\sim \frac{1}{8}$") stainless steel balls can be added to minimize agglomeration during the testing.

In the preferred embodiment of this invention, part of each lot of polymer particles was dissolved in mineral oil to obtain a six percent by weight solution by the following method using apparatus similar to that disclosed in Examples V to VII of U.S. Pat. No. 3 227 794 with simplications as described below.

21 Kg/hr of mineral oil and 1.4 kg per hour of particles from a lot of the polymer particles of Table I were fed to a stirred kettle heated to 20°–40° C. The residence time in the kettle was about two hours to form a slurry. The slurry was then pumped at a rate of 22.4 kg/hr through 12.5 m of a coiled heated tube having an internal diameter of 7 mm and heated to 250° C. with an outlet pressure of 800 psig, then through 17 m of a tube having an internal diameter of 1.7 cm, heated to 255° C., and then pumped directly to the spinnerette described in U.S. Pat. No. 4 413 100. Spinning temperature was 255° C. Different diameter and length (residence time) tubing may be used for different viscosity (molecular weight) polymers and for different particle sizes or particle size distributions. Yarn (fiber) preparation was as follows:

A 118 filament polyethylene yarn was prepared by the method described in U.S. Pat. No. 4 413 110 and Example 1 except stretching of the solvent extracted, dry yarn was done in-line by a multiple stage drawing unit having five conventional large Godet draw rolls with an initial finish applicator roll and a take-up winder which operates at 20 to 500 m/m, typically in the middle of this range. However, this rate is a balance of product properties against speed and economics. At lower speeds better yarn properties are achieved, but at higher speeds the cost of the yarn is reduced in lieu of better properties with present know-how.

After the partially oriented yarn containing mineral oil is extracted by trichlorotrifluoroethane (TCTFE) in a washer, it is taken up by a dryer roll to evaporate the solvent. The "dry partially oriented yarn" is then drawn by a multiple stage drawing unit. The Yarn from the washer containing about 70% by weight TCTFE is taken up by the first dryer roll at constant speed to ensure denier control and to provide first stage drying to about 5% of TCTFE. Drawing between dryer rolls at a temperature of about 90 to 120° C. is at 1.05 to 1.8 draw ratio with a tension generally at 3000 to 5000 grams.

A typical coconut oil type finish is applied to the yarn, now containing about 1% by weight TCTFE, as it leaves the second dryer roll, for static control and optimal processing performance. The draw ratio between the second dryer roll at about 60° C. and the first draw roll is kept at a minimum (1.10–1.2 D.R.) because of the cooling effect of the finish. Tension at this stage is generally 4500 to 6500 grams.

From the first draw roll to the last draw roll maximum draw at each stage is applied. Yarn is drawn between the first draw roll and the second draw roll (D.R. 1.5 to 2.2) at 125 to 140° C. with a tension of 5000 to 7000 grams. In the following stage (second roll and third roll), yarn is drawn at an elevated temperature (130° to 150° C.; D.R. 1.2) with a tension generally of 7000 to 9000. Between the third roll and fourth or last roll, yarn is drawn at a preferred temperature lower than the previous stage (135 to 145° C.) at a draw ratio of 1.15 with a tension generally of 7500 to 9500 grams. The drawn yarn is allowed to cool under tension on the last roll before it is wound onto the winder. The drawn yarn generally has a denier of about 1200, UE (ultimate elongation) about 3.7%, UTS (ultimate tensile strength)

about 30 g/denier (~2.5 GPa) and tensile modulus about 1200 g/denier (~100 GPa).

During processing of the various lots of Table I, dramatic differences were found between lots. Lots 1, 2, 6, 7, 9 and 10 processed into yarn having the above properties with no unusual problems. However, Lots 4 and 11 caused yarn (fiber) breakage upon drawing so often that the process could not operate. Also Lots 3 and 8 were only marginally operable because of individual filament breakage in the yarn (fiber) occurring at about four breaks an hour. Lot 5 was rated fair in break occurrences. Note that the unacceptable lots 4 and 11 had an unusually high percent of fine particles, both had well over half the particles small enough to pass through the No. 100 sieve, 149 micron screen opening. Conversely, these lots had a particle size distribution that did not test to retain over 40% by weight on the No. 80 sieve. Lot 11 only retained 7.6% and Lot 4 only 26.5%. Lot 8 is thought to have marginal performance due to the high intrinsic viscosity, 30 I.V., while Lot 3 has a marginal 42% by weight retained on No. 80 sieve test result. The performance of Lot 10 compared to Lot 3 may be explained by the I.V. difference, or by the fact that a nitrogen pressure blanket was used during processing of the lower I.V. particles.

EXAMPLE 2

FIG. 1 of U.S. Pat. No. 4,663,101, hereby incorporated by reference (see also FIG. 5 of U.S. Pat. No. 4 413 110), illustrates in schematic form another embodiment of the apparatus used to produce novel fibers, wherein the stretching steps include solution filament stretching and stretching at least two of the shaped solution or gel containing the first solvent, the shaped solution or gel containing second solvent; and the dry shaped solution or xerogel. As shown, a first mixing vessel 10 is fed with the intermediate molecular weight polymer 11 such as polyethylene of weight average molecular weight between about 200 000 and about 4 000 000 and is also fed with a first, relatively nonvolatile solvent 12 such as paraffin oil. First mixing vessel 10 is equipped with an agitator 3. The residence time of polymer and first solvent in first mixing vessel 10 is sufficient to form a slurry. The slurry is removed from first mixing vessel via line 14 to a preheater 15. (Preheater 15 replaces intensive mixing vessel 15 of the earlier apparatus, FIG. 5 of U.S. Pat. No. 4 413 110, otherwise the apparatus is the same.) The residence time and temperature in preheater 15 are sufficient to dissolve between about 5% and 50% of the polymer. From the preheater 15, the solution is fed to an extrusion device 18 containing a barrel 19 within which is a screw 20 operated by motor 22 to deliver polymer solution at resonably high pressure to a gear pump in housing 23 at a controlled flow rate. Motor 24 is provided to drive gear pump 23 and extrude the polymer solution, still hot, through a spinnerette at 25 comprising a plurality of aperatures, which may be circular, x-shaped or oval shaped, or in any of a variety of shapes having a relatively small major access in the place- of the spinnerette when it is desired to form fibers, and having a rectangular or other shape when an extended major access in the plane of the spinnerette when it is desired to form films or tapes.

A portion of Lot 7 of Table I was batch processed through the process and apparatus described above under the conditions shown in the following Tables II to IV.

An attempt to run a portion of Lot 4 of Table I was made on the same apparatus and process steps under the conditions shown in Table V.

TABLE II

| LOT 7 EXTRUDER RUN | |
|---|---|
| Concentration | 6% |
| Slurry Temperature | Initial 37° C. increased to 85° C. after 3 hours of 4-hour run |
| Extruder Screw Speed | 100 rpm |
| Preheater Temperature | 275° C. |
| Extruder Temperature | 240° C. |
| Extruder Pressure | 363 decreasing to 272 psi |
| Spinpack Pressure | 277 psi |
| Melt Pump Speed | 20 increasing to 40 rpm |
| Comments | Ran well |

TABLE III

LOT 7 STRETCHING 24.5 I.V. (Lot No. 7), 6 Wt. %
118 Filament × 0.040" × 40/1 (L/D) Spinnerette, 2¼"
open air to quench
Preheat Temperature = 275° C. at 210 cc/minute
Preheat Temperature = 250° C. at 400 cc/minute
3.5 m/minute takeup (1.54/1 die drawn) at 210 cc/minute
4.3 m/minute takeup (1.1/1 die drawn) at 400 cc/minute

| Run No. | Through-put cc/Min. | Stretch Gel | Stretch Dryer | Feed Stretch (m/mw) | Hot Stretch Stretch Ratio at 135° C. | Hot Stretch Stretch Ratio at 150° C. | Takeup Speed, m/mw |
|---|---|---|---|---|---|---|---|
| 1 | 210 | 8.19 | 1.2 | 12 | 2.8 | 1.25 | 35.9 |
| 2 | | | | 12 | 2.8 | 1.2 | 34.6 |
| 3 | | | | 24 | 2.5 | 1.2 | 62.1 |
| 4 | | | | 24 | 2.6 | 1.2 | 64.1 |
| 5 | | 7.64 | 1.2 | 12 | 2.75 | 1.25 | 35 |
| 6 | | | | 24 | 2.3 | 1.2 | 57 |
| 7 | 400 | 8.78 | 1.2 | 12 | 3.0 | 1.2 | 36 |
| 8 | | | | 24 | 2.75 | 1.2 | 68 |
| 9 | | 5.93 | 1.2 | 12 | 3.0 | 1.25 | 38 |
| 10 | | | | 24 | 2.7 | 1.2 | 67 |
| 11 | | 6.18 | 1.2 | 12 | 3.0 | 1.25 | 38 |
| 12 | | | | 12 | 3.5 | 1.2 | 43 |
| 13 | | | | 24 | 2.75 | 1.2 | 65 |
| 14 | | | | 36 | 2.5 | 1.2 | 94 |

TABLE IV

LOT 7 YARN PROPERTIES

| Run No. | Total (Solid) Stretch | Denier | Tenacity, g/Denier | Modulus, g/Denier | % U.E. |
|---|---|---|---|---|---|
| 1 | 53 | 927 | 31.6 | 1330 | 3.5 |
| 2 | 51 | 966 | 31.1 | 1300 | 3.7 |
| 3 | 45 | 1066 | 29.3 | 1180 | 3.9 |
| 4 | 47 | 1065 | 27.4 | 1160 | 3.6 |
| 5 | 48 | 957 | 30.0 | 1319 | 3.7 |
| 6 | 40 | 997 | 30.2 | 1240 | 4.0 |
| 7 | 32 | 1621 | 24.1 | 1025 | 3.2 |
| 8 | 30 | 1768 | 23.1 | 890 | 3.5 |
| 9 | 29 | 1556 | 24.7 | 1100 | 3.4 |
| 10 | 25 | 1876 | 23.3 | 917 | 3.7 |
| 11 | 31 | 1574 | 25.0 | 1010 | 3.9 |
| 12 | 34 | 1409 | 26.7 | 1170 | 3.8 |
| 13 | 27 | 1752 | 23.3 | 998 | 4.1 |
| 14 | 24 | 1892 | 22.1 | 865 | 4.1 |

TABLE V

LOT 4 EXTRUDER RUN

| | |
|---|---|
| Concentration: | 6% |
| Slurry Temperature: | Initial 37° C. increased to 95° C. in final hour of 4-hour run |
| Extruder Screw Speed: | Unable to maintain 100; mostly 50 rpm |
| Preheater Temperature: | 235–250° C. |
| Extruder Temperature: | 237–741° C. |
| Extruder Pressure: | Variable 56 to 267 psi |
| Spinpack Pressure: | Variable 147 to 500 psi |
| Meltpump Speed: | 40 rpm |
| Comments: | Not runnable; filaments break out when trying to stringup the takeup winder or too "soupy" to try stringup. |

EXAMPLE 3

An oil jacketed double helical (Helicone ®) mixer, constructed by Atlantic Research Corporation, was charged with linear polyethylene, mineral oil (Witco "Kaydol"), and 0.5 wt. % antioxidant (Shell "Ionol"), at concentrations, pumping rates, and stretch conditions of Table VI. See FIG. 5 of U.S. Pat. No. 4 413 110.

The linear polyethylene was Mitsu HI-ZEX 145M-60 having an intrinsic viscosity (IV) of 7.1 measured in decalin at 135° C., a weight average molecular weight of 694 000 kg/mol and a Mw/Mn of approximately 8. The particle size distribution was: 2% retained on No. 40 screen, 3% retained on No. 80 screen, 90% retained on No. 120 screen, and 5% on the pan. A No. 120 screen has 125 micron openings. The charge was heated with agitation at 60 rpm to 240° C. The bottom discharge opening of the Helicone mixer was adapted to feed the polymer solution first to a gear pump and then to a 19-hole spinning die. The holes of the spinning die were each of 0.040" diameter. The gear pump speed was set to deliver 15.2 to 38 cm$^3$/minute of polymer solution to the die. The extruded solution filaments were stretched about 40 to 1 in passing through a 2-inch air gap into a water quench bath at 15° C. wherein the filaments were quenched to a gel state.

The gel "yarn" was passed into a water cabinet in which the mineral oil content of the gel filaments was extracted and replaced by trichlorotrifluoroethane (TCTFE) at 35° C. The gel yarn was stretched 1.14:1 in traversing the washer. The extracted gel yarn was passed into a dryer cabinet where the TCTFE was evaporated from the yarn at 60° C. The dried yarn was stretched 1.14:1 at 60° C. as it exited the dryer cabinet. The extracted and dried xerogel yarn of 173 denier was wound onto a roll at 63.2 meters per minute.

The melting temperatures of the yarns were determined using a Perkin-Elmer DSC-2 differential scanning calorimeter. Samples of about 3.2 mg were heated in argon at the rate of 10° C./minute. The yarns showed a doublet endotherm in duplicate runs.

The gel yarn stretch ratios employed in Runs 1 to 22 were generally the highest that could be employed consistent with either of two constraints: breakage of the yarn, or physical limitations of the apparatus used. In general, physical limitations of the apparatus limited the gel yarn stretch ratio that could be employed with yarns spun with a solution stretch of above about 20:1. Therefore, the gel yarn stretch ratios recited in the examples should not be construed as fundamental limitations of the process as higher gel stretch ratios can be employed.

TABLE VI

| Run No. | Solution Concentration Weight % | Pumping Rate, cm$^3$/Minute | Stretch Ratios | | | | | |
|---|---|---|---|---|---|---|---|---|
| | | | Solution Yarn | Gel Yarn | Leaving Dryer | Zone No. 1 at 120° C. | Zone No. 2 at 145° C. | Overall |
| 1 | 6 | 38.0 | 1.1 | 9.02 | 1.24 | 3.0 | 1.35 | 50 |
| 2 | 6 | 38.0 | 3.1 | 4.5 | 1.3 | 3.75 | 1.4 | 95 |
| 3 | 6 | 15.2 | 8.8 | 3.39 | 1.22 | 2.9 | 1.4 | 147 |
| 4 | 6 | 15.2 | 8.8 | 3.39 | 1.22 | 2.9 | 1.5 | 158 |
| 5 | 6 | 15.2 | 29.0 | 1.85 | 1.14 | 3.6 | 1.4 | 308 |
| 6 | 6 | 15.2 | 46.6 | 1.15 | 1.14 | 3.5 | 1.4 | 299 |
| 7 | 8 | 38.0 | 1.1 | 9.62 | 1.25 | 3.3 | 1.2 | 52 |
| 8 | 8 | 15.2 | 3.16 | 5.61 | 1.25 | 4.5 | 1.3 | 131 |
| 9 | 8 | 15.2 | 8.65 | 3.4 | 1.20 | 4.0 | 1.3 | 184 |
| 10 | 8 | 15.2 | 36.8 | 1.46 | 1.14 | 5.5 | 1.4 | 472 |
| 11 | 10 | 38.0 | 1.09 | 8.44 | 1.24 | 2.75 | 1.4 | 44 |
| 12 | 10 | 29.2 | 3.25 | 7.34 | 1.17 | 3.0 | 1.5 | 126 |
| 13 | 10 | 12.8 | 8.74 | 7.43 | 1.14 | 2.75 | 1.4 | 285 |
| 14 | 10 | 16.4 | 19.4 | 2.78 | 1.14 | 3.9 | 1.5 | 360 |
| 15 | 12 | 38.0 | 1.1 | 8.94 | 1.31 | 2.75 | 1.4 | 50 |
| 16 | 12 | 15.2 | 18.1 | 2.97 | 1.14 | 3.0 | 1.5 | 276 |
| 17 | 12 | 15.2 | 26.7 | 2.02 | 1.14 | 2.8 | 1.4 | 241 |
| 18 | 12 | 15.2 | 38.2 | 1.41 | 1.14 | 3.5 | 1.4 | 301 |
| 19 | 15 | 15.6 | 1.1 | 8.6 | 1.19 | 2.5 | 1.2 | 34 |
| 20 | 15 | 15.6 | 18.2 | 3.0 | 1.14 | 2.25 | 1.4 | 196 |
| 21 | 15 | 15.2 | 26.7 | 2.0 | 1.14 | 2.25 | 1.5 | 205 |
| 22 | 15 | 15.6 | 38.6 | 1.39 | 1.14 | 3.0 | 1.3 | 239 |

The yarns were hot stretched with Zone No. 1 temperature maintained at 120° C. and Zone No. 2 temperatures at 145° C. The stretch ratios and the properties of the yarns obtained are given in Table VII.

TABLE VII

| Run No. | Denier | Tenacity, g/d | Modulus g/d | % UE | Melting Temp., °C.* | | |
|---|---|---|---|---|---|---|---|
| 1 | 119 | 24 | 1100 | 3.5 | | — | |
| 2 | 65 | 26 | 1380 | 3.7 | | — | |
| 3 | 41 | 30 | 1340 | 3.7 | | 146 | 151 |
| 4 | 46 | 29 | 1030 | 4.4 | | — | |
| 5 | 20 | 29 | 1480 | 3.3 | | 146 | 151 |
| 6 | 19 | 24 | 1040 | 4.1 | 134 | 146 | 148 |
| 7 | 187 | 24 | 1100 | 3.5 | | 146 | 151 |
| 8 | 90 | 19 | 790 | 4.4 | | — | |
| 9 | 50 | 30 | 1380 | 4.0 | | — | |
| 10 | 16 | 30 | 1180 | 4.5 | | 146 | 151 |
| 11 | 289 | 24 | 1040 | 3.9 | | — | |
| 12 | 84 | 31 | 1280 | 4.6 | | 146 | 151 |
| 13 | 45 | 28 | 1030 | 4.4 | | — | |
| 14 | 33 | 28 | 860 | 4.8 | | — | |
| 15 | 291 | 24 | 1290 | 3.5 | | — | |
| 16 | 43 | 28 | 1050 | 5.2 | | 142 | 150 |
| 17 | 44 | 28 | 870 | 6.1 | | — | |
| 18 | 44 | 27 | 840 | 6.5 | | 144 | 149 |
| 19 | 510 | 21 | 880 | 4.3 | | — | |
| 20 | 92 | 20 | 640 | 5.8 | | — | |
| 21 | 84 | 20 | 680 | 6.3 | | — | |
| 22 | 45 | 22 | 650 | 5.4 | | — | |

*Main melting peak is underlined

It is seen from the data of Runs 1-22 that yarn tenacity, modulus, elongation, toughness and melting temperatures may be regulated through a choice of solution concentration, solution stretch ratio, gel stretch ratio and yarn stretch ratios. The yarn properties are also functions of polymer IV and the respective stretch temperatures and speeds. The final product of Run 13 was characterized by X-ray diffraction, heat of fusion, density, and infrared dichroic measurements at 720 and 730 cm$^{-1}$. The results are as follows:

| | | |
|---|---|---|
| (a) | Density (kg/m$^3$) | 961 |
| (b) | Heat of fusion (cal/g) | 59.6 |
| (c) | X-ray crystallinity index | 0.65 |
| (d) | Crystalline orientation function ($f_g$) | 0.992 |
| (e) | Overall infrared fiber orientation function | 0.84 |

We claim:

1. A method to prepare high strength, high modulus polyolefin shaped articles comprising
    forming a heated solution of said polyolefin from particles of which about 75 to about 100% by weight have a particle size of from about 100 to about 400 microns and having a weight average molecular weight of from about 300,000 to 7,000,000, the particle size being distributed in a substantially Gaussian curve of particle sizes centered at about 125 to 200 microns so that the polyolefin particles are completely dissolved and the solution obtained therefrom is substantially uniform in properties throughout,
    extruding said heated solution,
    cooling said extruded solution, and
    stretching said extruded solution.

2. The method of claim 1 wherein said cooling is after removal of solvent from said shaped solution.

3. The method of claim 1 wherein said cooling is during removal of solvent from said shaped solution.

4. The method of claim 1 wherein said cooling is before removal of solvent from said shaped solution.

5. The method of claim 1 wherein about 85 to 100% of the particles have a particle size between about 120 and about 350 microns.

6. The method of claim 1 wherein the molecular weight is between about 700 000 and 5 000 000.

7. The method of claim 1 wherein the polyolefin is polyethylene.

8. The method of claim 7 wherein the molecular weight of the polyethylene is about 700 000 to about 5 000 000.

9. The method of claim 8 wherein the article is a fiber.

10. The method of claim 8 wherein the polyethylene intrinsic viscosity is between about 6 and b 30.

11. The method of claim 1 wherein at least about 40% of the particles are retained on a No. 80 mesh screen.

12. The method of claim 1 wherein the solvent is a hydrocarbon having a boiling point over 100° C.

13. The method of claim 12 wherein the solvent is selected from the group consisting of halogenated hydrocarbons, mineral oil, decalin, tetralin, naphthalene, xylene, toluene, dodecane, undecane, decane, nonane, octane, and low molecular weight polyethylene wax.

14. The method of claim 1 wherein the solution consists of about 1% to about 35% polyolefin by weight.

15. The method of claim 14 wherein the solution consists of from about 2 to about 25% by weight polyolefin.

16. The method of claim 1 wherein said stretching is after removal of solvent from the shaped solution.

17. The method claim 1 where said stretching is before removal of solvent from the shaped solution.

18. The method of claim 1 wherein the shaped solution is stretched both before and after removal of solvent from said shaped solution.

19. The method of claim 1 wherein the shaped article has been stretched to a length at least five times its original length.

* * * * *